(12) United States Patent
Dumitrascu et al.

(10) Patent No.: US 7,885,978 B2
(45) Date of Patent: Feb. 8, 2011

(54) SYSTEMS AND METHODS TO FACILITATE UTILIZATION OF DATABASE MODELING

(75) Inventors: Adrian Dumitrascu, Bellevue, WA (US); Cristian Petculescu, Redmond, WA (US); Matthew E. Carroll, Seattle, WA (US); Paul J. Sanders, Seattle, WA (US); Thomas P. Conlon, Redmond, WA (US); Amir Netz, Bellevue, WA (US); Oleg Lvovitch, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 610 days.

(21) Appl. No.: 11/069,480

(22) Filed: Mar. 1, 2005

(65) Prior Publication Data
US 2006/0010157 A1    Jan. 12, 2006

Related U.S. Application Data

(60) Provisional application No. 60/586,844, filed on Jul. 9, 2004, provisional application No. 60/586,605, filed on Jul. 9, 2004.

(51) Int. Cl.
*G06F 17/30* (2006.01)
(52) U.S. Cl. .................................................. 707/802
(58) Field of Classification Search ........................ None
See application file for complete search history.

(56) References Cited

U.S. PATENT DOCUMENTS 6,601,057 B1 * 7/2003 Underwood et al. ............ 707/1
6,898,609 B2 * 5/2005 Kerwin ....................... 707/203
7,328,207 B2 * 2/2008 Dumitru et al. ................ 707/3
2002/0133504 A1 * 9/2002 Vlahos et al. ............ 707/104.1
2005/0114329 A1   5/2005 Dettinger
2006/0010142 A1   1/2006 Kim
2006/0026167 A1   2/2006 Pasumansky et al.

OTHER PUBLICATIONS

U.S. Appl. No. 11/069,342, filed Mar. 1, 2005, Pasumansky, et al.
XML for Analysis Specification Version 1.0. Microsoft Corporation and Hyperion Solutions Corporation. Last Updated Apr. 24, 2001. 107 pages. http://www.xmla.org/download.asp?id=2.
Decision Support Objects. Microsoft Corporation. Last viewed on Jun. 27, 2005. 1 page. http://msdn.microsoft.com/library/default.asp?url=library/en-us/olapdmpr/prabout_84a4.asp.

(Continued)

*Primary Examiner*—Pierre M Vital
*Assistant Examiner*—Loan T Nguyen
(74) *Attorney, Agent, or Firm*—Merchant & Gould P.C.

(57) ABSTRACT

The subject invention relates to systems and methods that extend the network data access capabilities of mark-up language protocols. In one aspect, a network data modeling system is provided. The system includes a protocol component that employs a computerized mark-up language to facilitate data interactions between network components. An extension component operates with the protocol component to support the data transactions, where the extension component supplies various commands above standard network and database protocols. An object model is provided as a wrapper to the extensions in order to support various online and offline database development applications.

16 Claims, 10 Drawing Sheets

OTHER PUBLICATIONS

Zhaohui Tang, Ole DB for Data Mining—DRAFT Specification. Version 1.0. Microsoft Corporation, Jun. 2000, 129 pages.

Final Office action received for U.S. Appl. No. 11/069,342, dated Jan. 12, 2009.

Dime Specification Index Page, Microsoft Corporation, Last Viewed on Jun. 27, 2005, 1 Page, http://msdn.microsoft.com/library/default.asp?url=library/en-us/dnglobspec/html/dimeindex.asp.

H.F. Nielsen et al., Direct Internet Message Encapsulation, Internet Engineering Task Force, Jun. 17, 2002, 24 Pages, http://msdn.microsoft.com/library/en-us/dnglobspec/html/draft-nielsen-dime-02.txt.

J. Kangasharju, S. Tarkoma, and K. Raatikainen, Comparing SOAP Performance for Various Encodings, Protocols, and Connections, In Personal Wireless Communications, Lecture Notes in Computer Science 2775, Springer-Verlag, Sep. 2003.

Ken Henderson, Section "Transaction Commands and Syntax" in Chapter 17 of "The Guru's Guide to Transact-SQL", Addison Wesley, 2000 .

Tomas Restrepo, "Authentication the SSPI way", 2001.

Office Action dated Jul. 27, 2008 cited in U.S. Appl. No. 11/069,342.

Office Action dated Jul. 25, 2007 cited in U.S. Appl. No. 11/116,832.

Office Action dated Feb. 11, 2008 cited in U.S. Appl. No. 11/116,832.

Office Action dated Sep. 29, 2008 cited in U.S. Appl. No. 11/116,832.

Office Action dated Apr. 16, 2009 cited in U.S. Appl. No. 11/116,832.

Notice of Allowance issued in U.S. Appl. No. 11/116,832, dated Feb. 19, 2010, 19 pages.

Non Final Office Action in U.S. Appl. No. 11/116,832 dated Nov. 12, 2009, 18 pages.

Response dated Dec. 16, 2009 to Non Final Office Action mailed Nov. 12, 2009 in U.S. Appl. No. 11/116,832, 16 pages.

Response dated Jul. 8, 2009 to Non Final Office Action mailed Apr. 16, 2009 in U.S. Appl. No. 11/116,832, 12 pages.

Response dated Nov. 26, 2008 to Final Office Action mailed Sep. 29, 2008 in U.S. Appl. No. 11/116,832, 8 pages.

Response dated May 9, 2008 to Non Final Office Action mailed Feb. 11, 2008 in U.S. Appl. No. 11/116,832, 8 pages.

Response dated Nov. 21, 2007 to Non Final Office Action mailed Jul. 25, 2007 in U.S. Appl. No. 11/116,832, 7 pages.

Notice of Allowance issued in U.S. Appl. No. 11/069,342 dated Sep. 30, 2010, 15 pages.

Response dated Jul. 8, 2009 to Final Office Action mailed Jan. 12, 2009 in U.S. Appl. No. 11/069,342, 9 pages.

Response dated Oct. 27, 2008 to Non Final Office Action mailed Jul. 24, 2008 in U.S. Appl. No. 11/069,342, 11 pages.

"XML for Analysis Specification, version 1.1", Microsoft Corp. and Hyperion Solutions Corp, Nov. 2002, 107 pages.

* cited by examiner

SYSTEMS AND METHODS TO FACILITATE UTILIZATION OF DATABASE MODELING

RELATED APPLICATIONS

This application claims priority to U.S. Provisional Patent Application Ser. No. 60/586,844 filed on, Jul. 9, 2004 and entitled SYSTEMS AND METHODS TO FACILITATE UTILIZATION OF DATABASE MODELING, the entire contents of which are herein incorporated by reference. This application also claims priority to U.S. Provisional Patent Application Ser. No. 60/586,605 filed on, Jul. 9, 2004 and entitled SYSTEMS AND METHODS OF UTILIZING AND EXPANDING STANDARD PROTOCOL, the entire contents of which are also herein incorporated by reference.

TECHNICAL FIELD

The subject invention relates generally to computer systems, and more particularly, relates to systems and methods that facilitate database access between clients and servers via employment of an object model that supports on-line and off-line development of database code by hiding or wrapping implementation details of an extension protocol.

BACKGROUND OF THE INVENTION

Communications XML for Analysis is a Simple Object Access Protocol (SOAP)-based XML API, designed for standardizing data access interaction between a client application and a data provider working over the Web. Currently, under traditional data access techniques such as OLE DB and ODBC, a client component that is tightly coupled to a data provider server must be installed on the client machine in order for an application to be able to access data from the data provider. Tightly coupled client components, however, can create dependencies on a specific hardware platform, a specific operating system, a specific interface model, a specific programming language, and a specific match between versions of client and server components.

The requirement to install client components and the dependencies associated with tightly coupled architectures are unsuitable for the loosely coupled, stateless, cross-platform, and language independent environment of the Internet. To provide reliable data access to Web applications, the Internet, mobile devices, and cross-platform desktops, a standard methodology is required that does not require component downloads to the client. One possibility involves the Extensible Markup Language (XML) which is generic and can be universally accessed. Thus, instead of invoking a proprietary interface of a client component, it would be desirable for developers to call methods and transfer data through XML HTTP messages without any client components. It would also be desirable if the application developer could build client components without concern for tight coupling to a server component or application. Also, an application developed with any programming language and running on any platform, should be able to access data from any place on the Web without having to plan for specific platform support or even a specific provider version. One such vehicle for these and other network data access goals is provided by a protocol known as the Extensible Markup Language for Analysis or XMLA.

The protocol XML for Analysis advances the concepts of OLE DB by providing standardized universal data access to a standard data source residing over the Web without the need to deploy a client component that exposes Component Object Model (COM) interfaces. Additionally, XML for Analysis is optimized for the Web by minimizing roundtrips to the server and targeting stateless client requests to maximize the scalability and robustness of a data source. Much of the protocol with XMLA is related to two methods, Discover and Execute, which consume and send XML for stateless data discovery and manipulation.

Generally, XMLA protocol is built upon the open Internet standards of HTTP, XML, and SOAP, and is not bound to any specific language or technology. The specification references OLE DB so that application developers already familiar with OLE DB can easily determine how XML for Analysis can be mapped and implemented. Even though XMLA provides many advantages over previous architectures, there are still many applications that are not adequately covered by this protocol. These include current implementations of the Execute method as well as many features such as object design, parameter specifications, binary manipulations, and employment of other network protocols than HTTP, for example.

Related to the protocols described above, some database products typically include a set of development tools allowing associated objects (primarily cubes and dimensions) to be defined. The traditional approach with such tools is that they operate directly on some specific server. Hence, when a developer uses such tools to create a new database they typically: Connect to some chosen server, and create a new database; Define new objects using the tools; and Save the new objects, which are then created on the chosen server, if they are complete and valid. The objects can then be used in queries to the server. Although these database techniques have been proven effective in many cases, the requirements for connecting to a specified server before proceeding with other development activities is not flexible enough to account for some development applications.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates to systems and methods that employ an object model wrapper to facilitate online database manipulations and offline authoring of database applications. In one aspect, an object model is provided that serves as a wrapper for various markup language extensions (e.g., Extensible Markup Language for Analysis (XMLA) extensions) for database server management. This allows introducing a procedural programming language on top of the language extensions to mitigate the need for programming directly with extension calls which can be less productive than programming with the higher-level procedural language. The procedural language also offers additional functionality that is generally not directly part of the language extensions.

In one example, XMLA protocol can be employed as a native engine protocol for database manipulations, wherein several sets of extensions to XMLA have been adapted to increase the underlying functionality of standard XMLA protocol. Generally, it is desirable to have a system be one which is highly efficient and productive to use for those who administer related database servers employing extended protocols. Thus, the object model can be utilized on top of the XMLA extensions to enable administrators to be more efficient, as they can author utilities specific to their sites that will also allow server management to be more efficient and also enable the possibility of third party providers creating specialized server management tools.

As noted above, the object model wrapper serves online data manipulations and promotes development of offline applications, as well. In another aspect, an alternative approach is provided, whereby developers can also work offline from substantially any server. This can be achieved by allowing the definition of On-Line Analytical Processing (OLAP) objects (e.g., cubes and dimensions) to be edited offline from substantially any OLAP server, and persisted in a set of files. Such definitions can later be deployed to a designated server for further data manipulations. By providing offline programming capabilities, other applications can also be supported such as offline authoring and development of data mining models.

To the accomplishment of the foregoing and related ends, certain illustrative aspects of the invention are described herein in connection with the following description and the annexed drawings. These aspects are indicative of various ways in which the invention may be practiced, all of which are intended to be covered by the subject invention. Other advantages and novel features of the invention may become apparent from the following detailed description of the invention when considered in conjunction with the drawings.

DETAILED DESCRIPTION OF THE INVENTION

The subject invention relates to systems and methods that extend the network data access capabilities of mark-up language protocols. In one aspect, a network data modeling system is provided. The system includes a protocol component that employs a computerized mark-up language to facilitate data interactions between network components. An extension component operates with the protocol component to support the data transactions, where the extension component supplies various commands above standard network and database protocols. An object model is provided as a wrapper to the extensions in order to support various online and offline database development applications. The extensions include create commands, alter commands, delete commands, and so forth along with new discovery command capabilities. The extensions further include a parameter specification component for the statement command, a row set component for the statement command, a binary markup language extension for communications, and/or a protocol binding extension to support TCP/IP transactions.

As used in this application, the terms "component," "protocol," "system," "object," "model," "wrapper," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes (e.g., data from one component interacting with another component in a local system, distributed system, and/or across a network such as the Internet).

Figure 1:
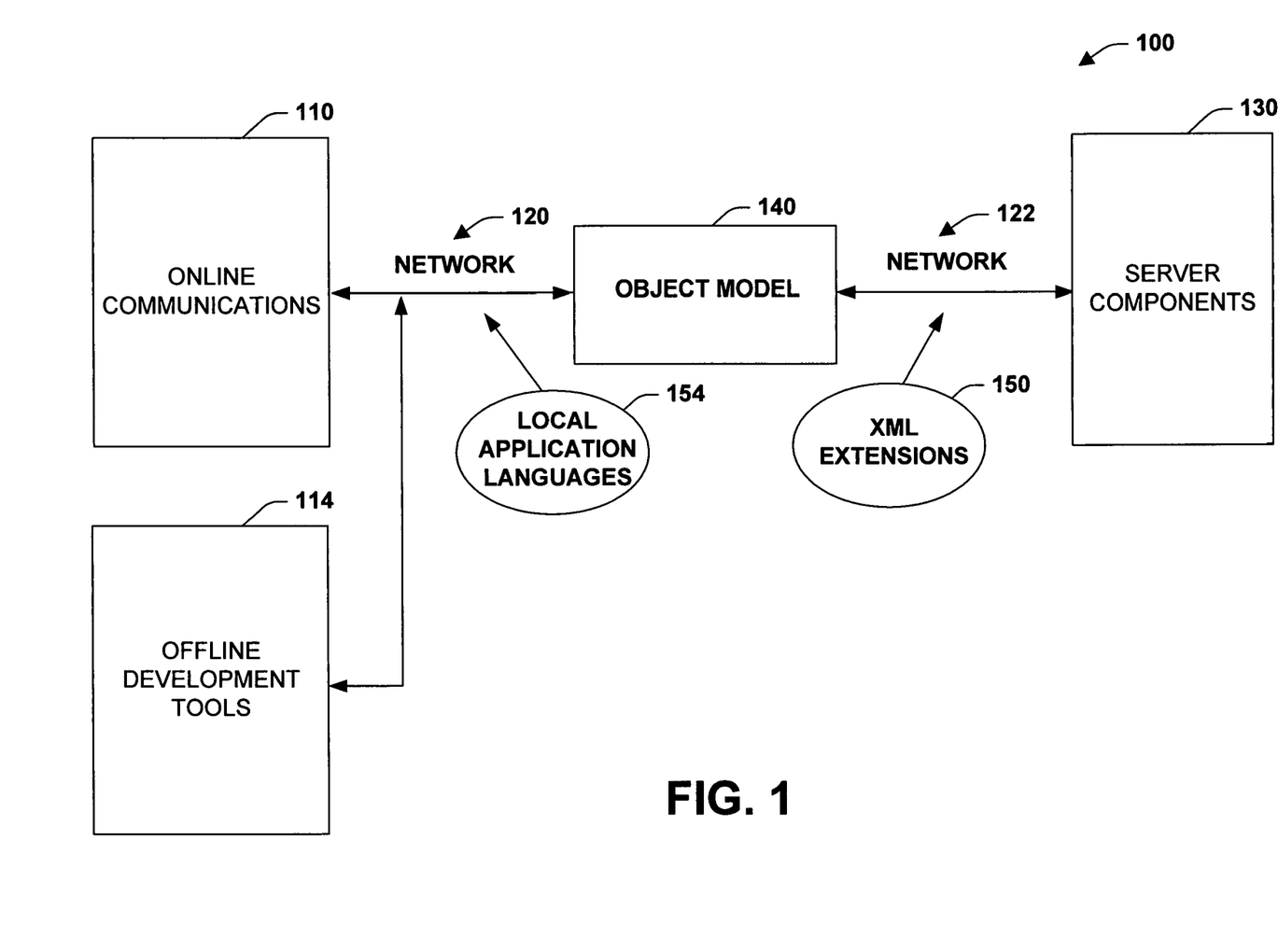
FIG. 1 is a schematic block diagram illustrating a network data transfer system and object model in accordance with an aspect of the subject invention.

Referring initially to FIG. 1, a network data transfer system 100 and object model is illustrated in accordance with an aspect of the subject invention. The system 100 supports online communications at 110 and/or offline development of database applications via a tool 114 across a network shown at 120 and 122 with one or more server components 130 (e.g., Online Analytical Processing (OLAP) database). The networks 120 and 122 can be local networks and/or global networks such as the Internet, for example. An object model 140 is provided to isolate online and/or offline application development from protocol details of the server components 130 such as from markup language or language extensions illustrated at 150. Thus, the online database communications at 110 and/or offline development at 114 can conveniently commence in a local application language or procedural language at 154 while being relieved of burdens of the markup language or extensions at 150. This is achieved by employing the object model 140 as a wrapper which hides language details of the extensions 154 from the local application languages 150.

In general, the object model 140 operates as a protocol component that employs computerized mark-up languages or extensions to facilitate data interactions between network components. The object model wraps the languages or extensions inside a subsequent data language (e.g., procedural language) in order to support online and offline database languages in a convenient manner for developers or administrators. As will be described in more detail below, many features are supported by the object model in accordance with the online communications 110. These include such aspects as supporting command options as override arguments to method calls or as properties on one or more objects. Other features include deploying stored procedures by loading a file, recording of at least one software buffer trace event, providing a capture mode to examine code generated by the object model 140, and providing a scripting capability that generates scripts that define server objects. This includes at least one option to apply different database operations to an object scripting operation. Still yet other online features include enabling system impact analysis, determining a server load on one or more object demands, providing a validate method that is called on objects without server interaction, providing an object dependency calculator, and providing a bindings helper to determine data source bindings.

The offline development tool 114 is enabled via the object model 140 to create, define, and/or save new objects in files that are separate from the server components 130. Some aspects of the tool 114 include a configurations file to enable concurrent object developments by multiple parties. Another aspect includes a deployment utility to deploy offline applications to the server components 130. There are several benefits to allowing such an offline development approach, over traditional 'online' development schemes, including: Offline tools can provide greater support for intermediate, incomplete states of objects. Hence, during development it is usually important that changes can be saved even if currently incomplete or invalid. This is possible as the changes are saved to a file rather than the server, and then any detected errors can be reported during Build/Deploy operations. By adopting an XML format stored in files, it is possibly for the developers to exploit the characteristics of files. In particular this includes: The object definitions can easily be checked into a Source Code Control System to provide versioning support; the files can be diff-ed and merged using standard tools that operate on files; the files can be edited directly; and the files provide a simple and convenient mechanism for distribution and sharing. Thus, team development is simplified.

In the traditional approaches, a set of developers working on a common set of objects would generally work against the same server, and experience issues of contention, and lack of isolation. In the offline approach, different developers can work on subsets of the files, using a Source Code Control System to manage contentions. Each developer can deploy to their own server, and can therefore remain isolated from each other's work until they choose to synchronize with each other's changes. The offline approach allows greater integration with other technologies. For instance, commonly, OLAP objects are defined only as part of a larger solution, involving other artifacts (e.g., source code, or report definitions). As such, artifacts for other technologies are also commonly stored in the file system. By also using the file system, the offline development allows all artifacts (including OLAP) of a solution to be stored, versioned, and managed together. Users can also continue to work even if no server is available (e.g., when working disconnected from any network). This enables the user to easily manage different configurations, where different values of properties apply for different environments. In another aspect, a deployment utility eases the process of managing the deployment of later versions of objects.

Figure 2:
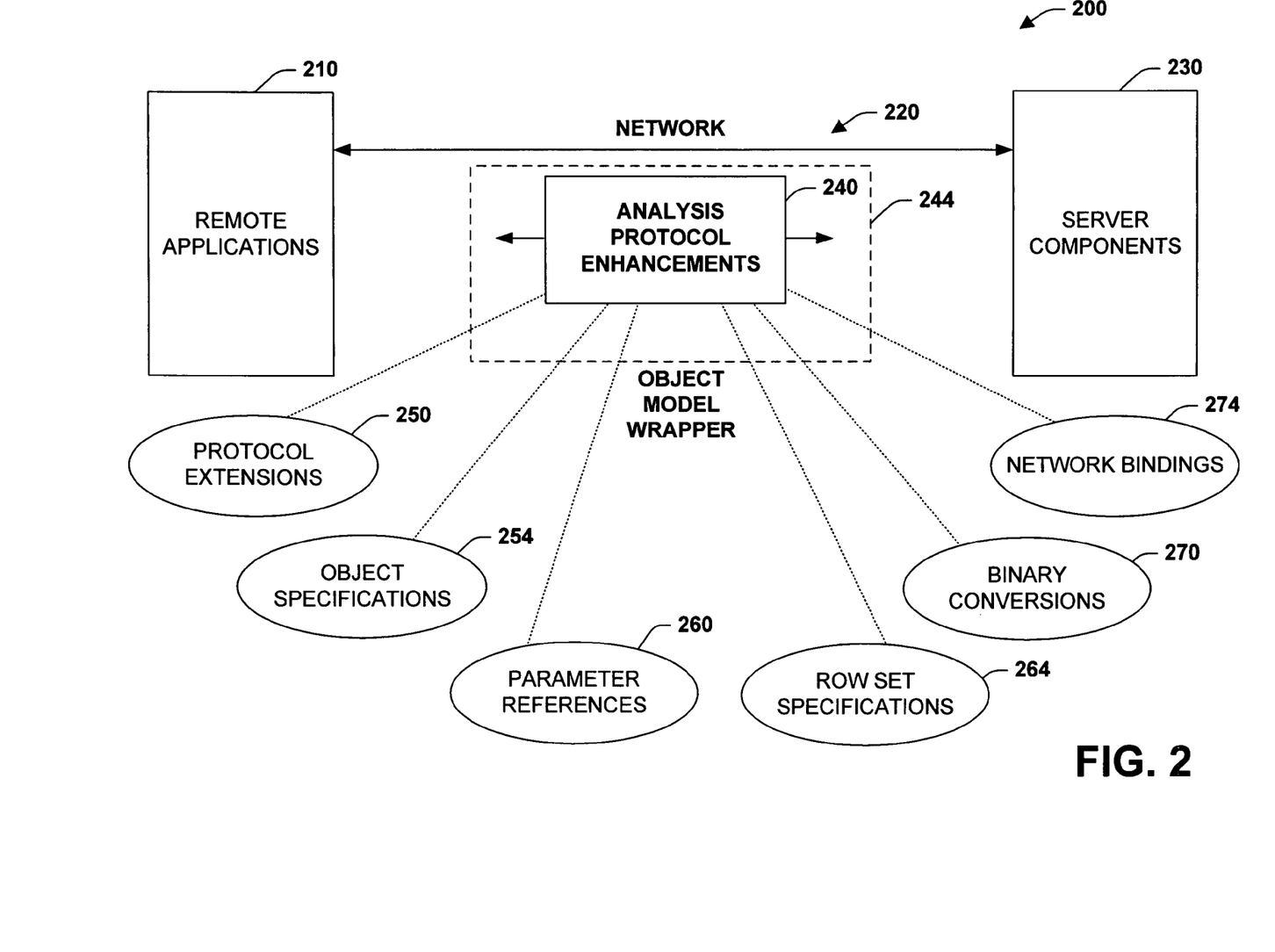
FIG. 2 is a block diagram illustrating an exemplary network system employing extended network protocols within an object model wrapper in accordance with an aspect of the subject invention.

Referring now to FIG. 2, an exemplary network system 200 that employs extended network protocols within an object model wrapper is illustrated in accordance with an aspect of the subject invention. The system 200 includes a remote application 210 or applications that communicate over a network 220 (e.g., Internet) to one or more remote server components 230 (e.g., OLAP data servers). An analysis protocol component 240 includes one or more protocol enhancements that facilitate data communications over conventional analysis protocols. For instance, a base analysis protocol for communications can include an Extensible Markup Language for Analysis (XMLA), where the protocol component 240 extends the capabilities of the base protocol in various manners which are described in more detail below. It is to be appreciated however, that other markup languages can be extended in accordance with the subject invention (e.g., Wireless Markup Languages (WML)). In addition to the analysis protocol 240, an object model wrapper protocol 244 hides or mitigates implementation details of the server components 230 by translating or mapping server protocols utilizing the analysis protocol 240 to local procedural language protocols suitable for the remote applications 210.

The analysis protocol enhancements 240 include various options such as command protocol and property extensions illustrated at 250. For instance, XMLA can be extended where commands such as Discover and Execute methods are added to the base protocol along with extended property enhancements. At 254, object descriptions and structure is provided to describe data transactions and interfaces between to the remote applications 210 and server components 230. At 260, protocol enhancements 240 include allowing the base protocol to be parameterized and allowing the parameters to be sent with the same message as the statement itself, if desired. Similarly, at 264 row set parameters extend base languages by describing how database row sets should be represented at the transport level of communication between the server components 230 and the remote applications 210. Other protocol enhancements 240 include mappings between network components at 270 (e.g., binary to XML mappings) along with enhanced network binding functionality at 274 (e.g., TCP/IP bindings over and above conventional HTTP bindings).

Figure 3:
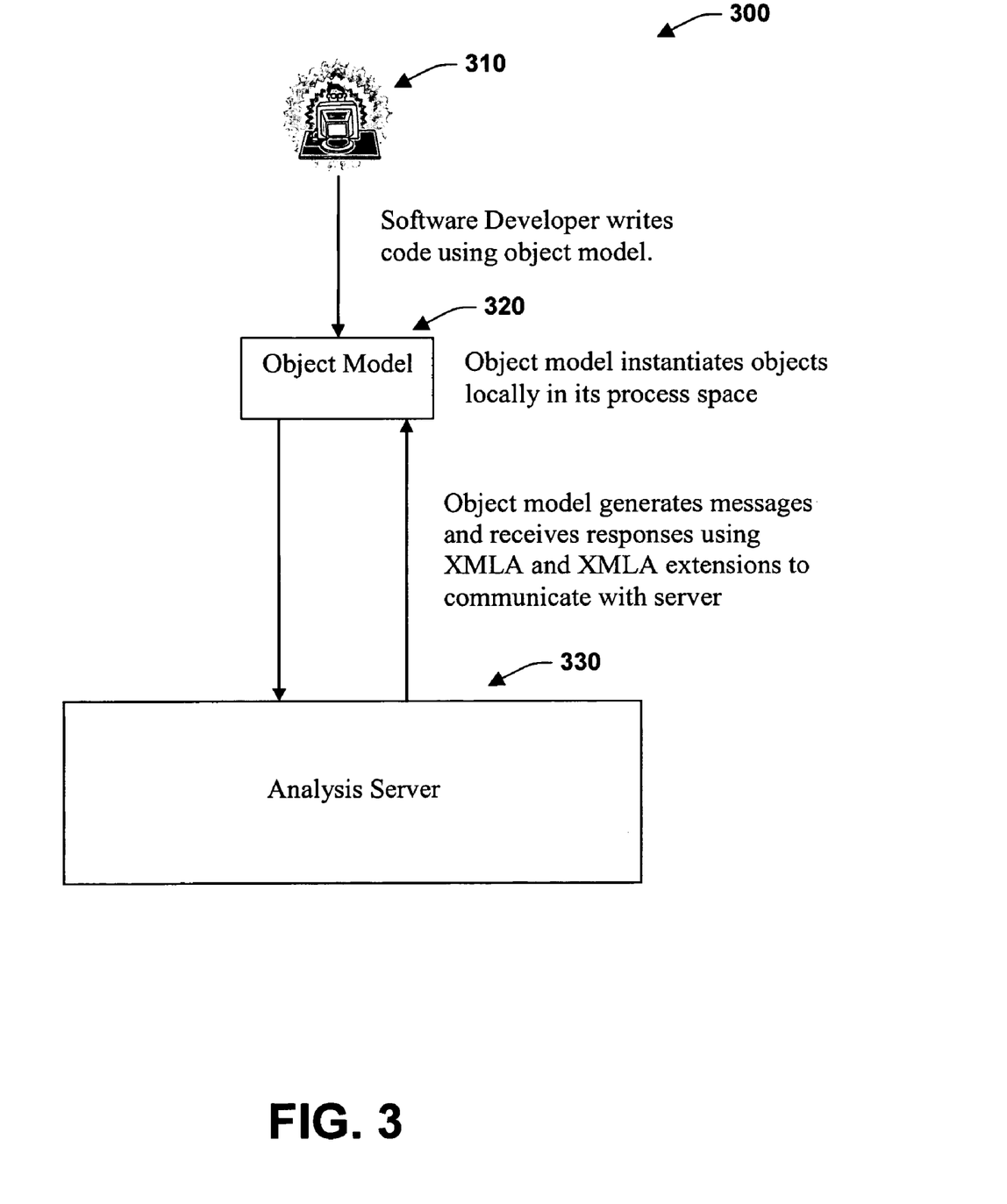
FIG. 3 is a block diagram illustrating an example network system employing an object model for online applications in accordance with an aspect of the subject invention.

Turning to FIG. 3, an example network system 300 employing an object model for online applications is illustrated in accordance with an aspect of the subject invention. In this case, a software developer at 310 utilizes an object model 320 to translate between local application languages to XMLA and XMLA extended protocols at 330. In general, the object model 320 is a direct wrapper for the XMLA extensions for server management. Command in an engine API provide a method call in the object model 320. Options on the commands are available as either override arguments to the method call, or as properties on the objects. In addition, the object model 320 offers features that go beyond XMLA extensions, to add additional capabilities and conveniences for programming with the object model 320. These include deploying a stored procedure by loading a file, ability to listen for a trace event, capture mode (to capture the XML that is generated by the object model), a scripting capability that allows generating the XML script that defines server objects with optional ability to apply different operations to the scripting of the objects, support of impact analysis, load on demand of objects, and a Validate method that can be called by the programmer to validate objects without requiring a round trip to the server.

Other aspects of the object model 320 include a dependency calculator which can help a programmer determine which objects are dependent upon other objects, and an Allowed Bindings Helper, which informs the programmer what bindings to data sources are valid for an object in a particular context. The object model 320 instantiates objects within its own process space, and upon issuing of an Update method call, will send copies of its objects to the server 330. The objects can be instantiated either by the programmer creating objects starting from new objects, or by loading copies of objects that already exist on the server 330. In addition, there is a Commands object model, in which a set of objects represent the commands (methods) in the rest of the object model 320. The use of the Commands object model is to allow serialization of a command, as if it were an object, which is useful for persisting a valid command without sending it immediately to the server 330.

Figure 4:
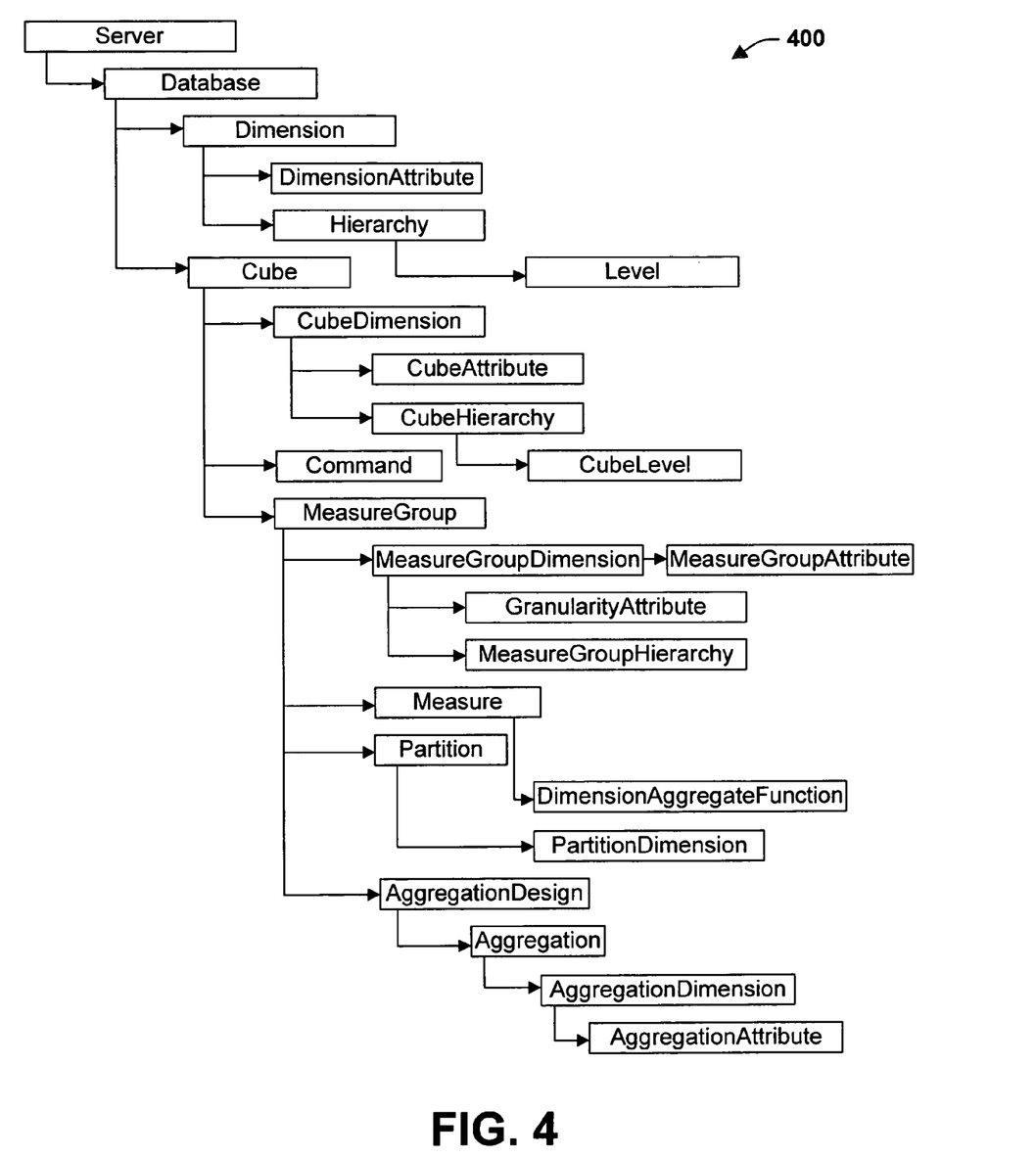
FIGS. 4 and 4a illustrate an example object structure for network data transfers and object modeling in accordance with an aspect of the subject invention.
Figure 4A:
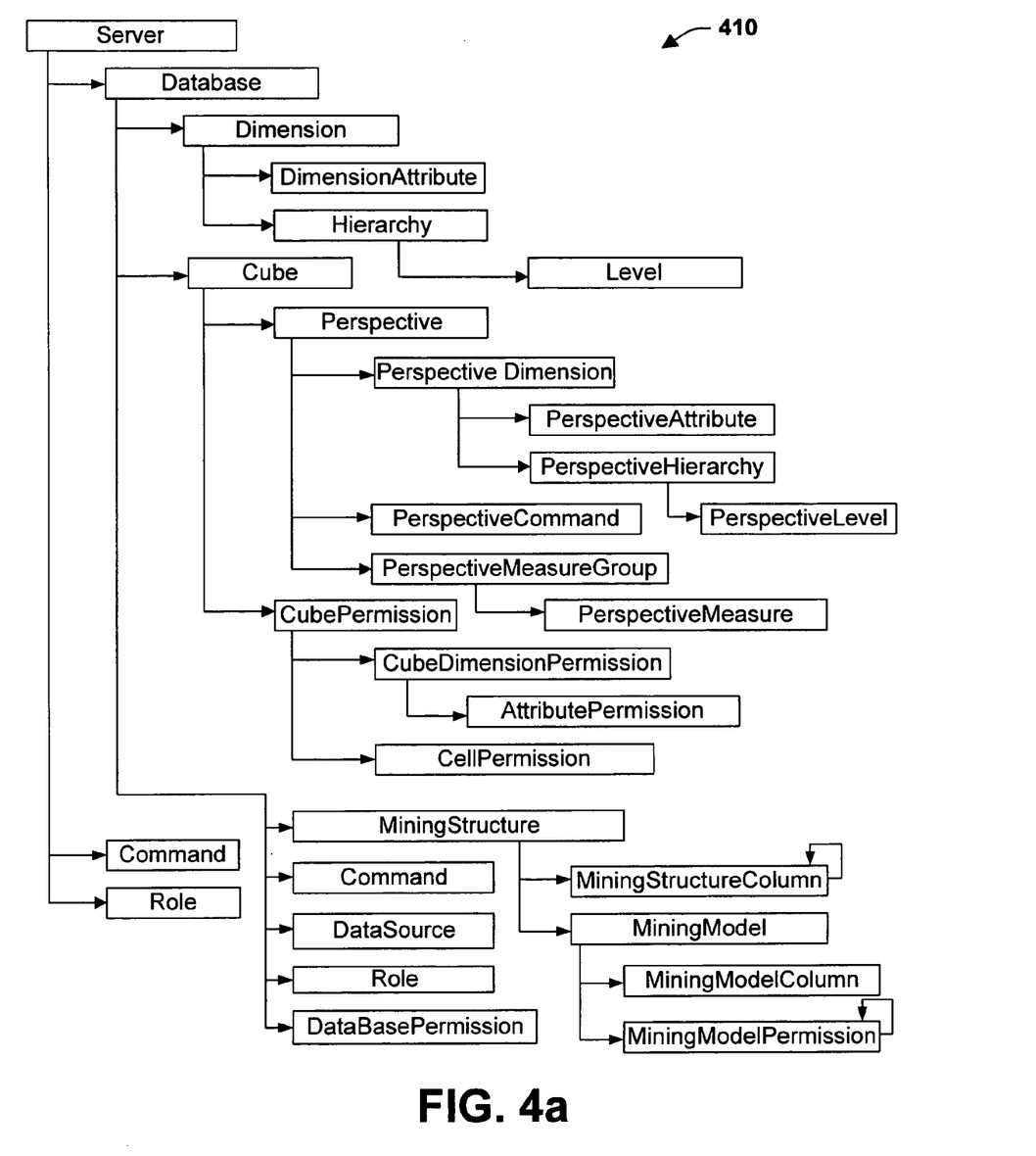

FIGS. 4 and 4*a* illustrate an example object structure 400 for network communications and object modeling in accordance with an aspect of the subject invention. The structures 400 and 410 provide a general outline for respective components or objects that populate the object model described above. The following is a list of some of the major objects appearing in the structure 400 and can include: Server objects; Database objects; Dimension objects; Cube objects; Measure Group objects; Partition objects; Perspective objects; Aggregation Design objects; Mining Structure objects; Mining Model objects; Data Source objects; Data Source View objects; Trace objects; Assembly objects; Mdx Script objects; Role objects; Database Permission objects; Dimension Permission objects; Cube Permission objects; Mining Structure Permission objects; Mining Model Permission objects; and Data Source Permission objects, for example.

Figure 5:
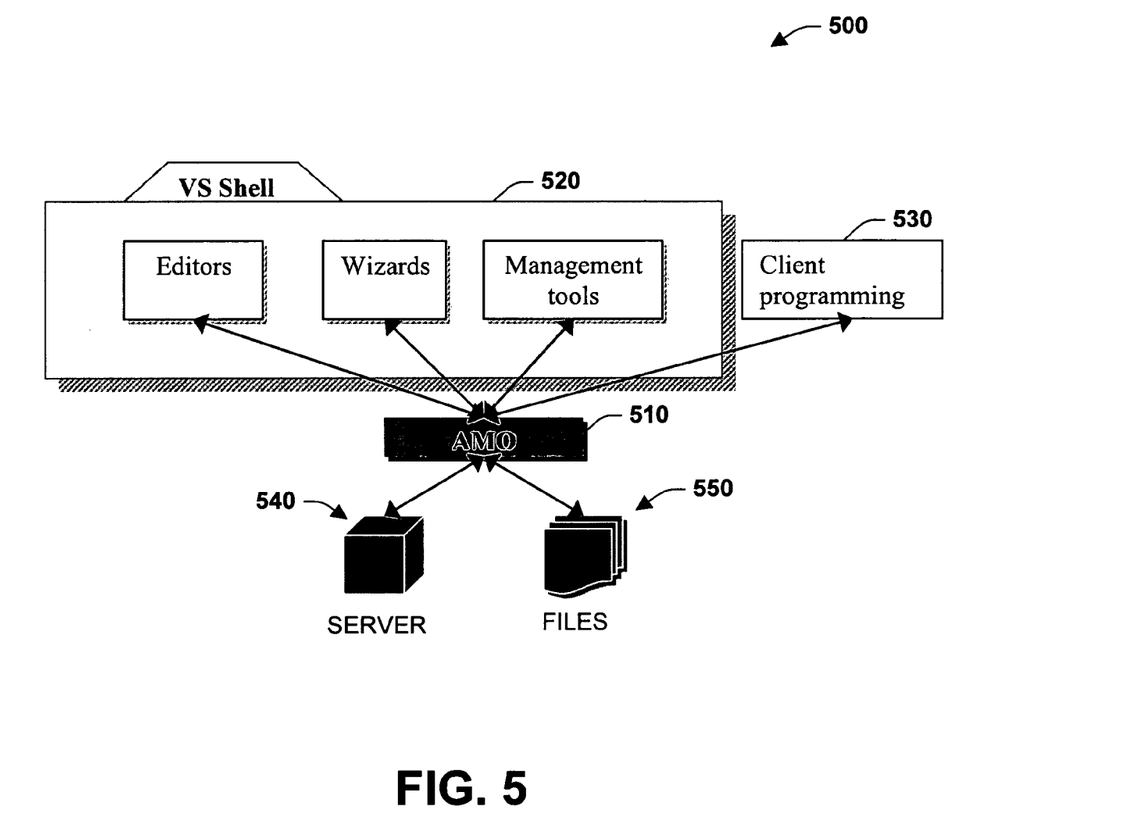
FIG. 5 illustrates an example system for communicating information via an object model in accordance with an aspect of the subject invention.

FIG. 5 illustrates an example system 500 for communicating information via an object model in accordance with an aspect of the subject invention. In this example, an analysis management object 510 functions as the object model described above. The object can communicate with a shell application 520 and/or another client application 530 in local or procedural application languages suited for the respective applications. The shell application 520 can include such programs as editors, wizards, and/or management tools, for example, for manipulating database objects in an online and/or an offline manner as noted above. The analysis management object 510 enables communications to one or more servers at 540 in an online manner and also enables creation of files 550 that can be deployed as desired to the servers 540 or other servers that are not shown. Also, similar to the object model described above, the analysis management object 510 translates protocols between local application languages of the shell application 530 and/or client programs 530 to languages that are supported by the servers 540 and/or files 550 (e.g., translate from a local procedural language to an XMLA protocol or XMLA extended protocol).

Figure 6:
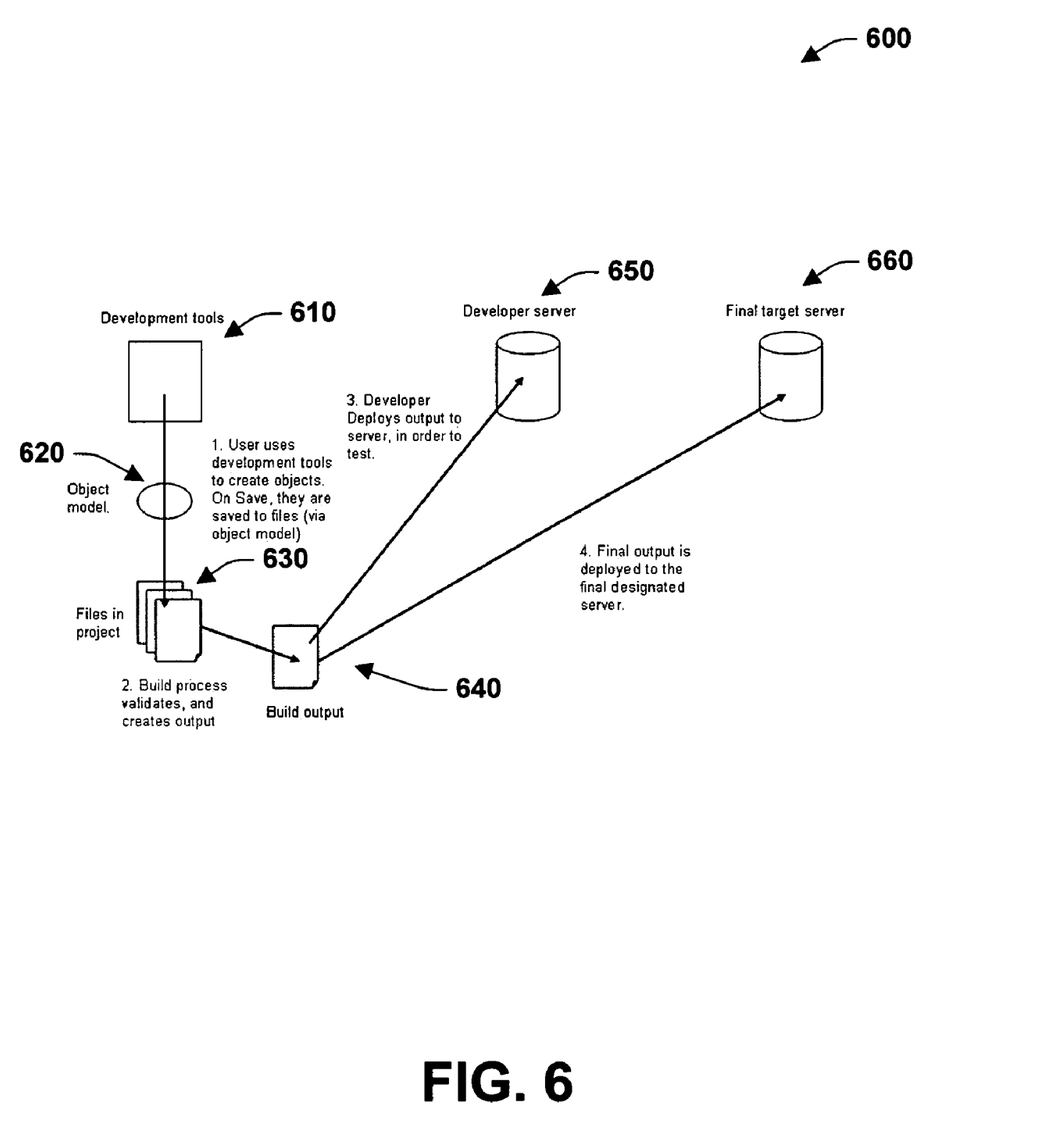
FIG. 6 illustrates an example offline system for authoring database applications in accordance with an aspect of the subject invention.

Turning to FIG. 6, an example offline programming system 600 for authoring and manipulating database applications is illustrated in accordance with an aspect of the subject invention. In this example, an offline development tool 610 employs an object model at 620 to build one or more offline files for a database project at 630. The files 630 are then sent to a build to generate an output at 640, where the build is then deployed to a development server 640 as part of an offline check-in procedure, or deployed to a final target server at 660 to convert a developed offline application into a running or prospective database application.

In the system 600, when a developer uses tools to create a new OLAP database they generally create a new project, which includes a set of files in the file system, they define new objects using the tools 610, and they save the new objects. Each object is typically saved using an XML representation stored in a file in the file system. As a separate distinct step the developer usually Builds the files into output at 640, and then deploys, the definitions. Build is the process of validating the contents of the files, and ensuring that the object definitions are valid and complete. During this process a validated output file is created at 640. Deploy is the process of taking the output file created in the Build, and sending the contents to a chosen target server at 640 or 650. This results in the objects being created on the server, and those objects can then be used in database queries to the server or in data mining operations.

The XML representation used for each object is generally the same as used by the OLAP server in its DDL (Data Definition Language). This eases the process of sending the offline definitions to a server. The set of objects contained within a single database are decomposed into separate files, rather than one file. This allows for easier management and sharing of the definitions. The design tools operate against the object model 620. It is this model that is capable of persisting the definitions either to a server (as in the traditional online approach) or to files in an offline approach. Hence, the same set of tools can be exploited in either mode of operations. In addition, the XML definition can be edited directly by the developer and then the changes read from the files and (if valid) the tools can reflect the changes.

The build and deployment process are generally incremental. Thus, upon making a change, and then again Building or Deploying, only the changed objects, and any other objects impacted by the change, typically need or should be processed. As well as the Deployment process conducted frequently during the development of new objects, there is also a separate utility provided to Deploy the final output to a different designated server. This process has much in common with the Deploy process, but offers the following additional capabilities: Certain properties on the OLAP objects are references to other resources in the physical environment. For example, a connection string to a relational database or a physical file location are references. Such properties are termed 'configuration properties', and they are commonly changed as the output from a project is deployed to a different target server. The deployment utility provides support in changing such configuration properties during deployment. Commonly, after an initial version of a set of OLAP objects is deployed, further changes are made, and sometime later a second version needs to be deployed. However, in the interim, some changes are likely to have been made to the original deployed copy, to reflect the management operations. The deployment utility provides support to merge the new definitions coming from the development project with the current deployed version.

In another aspect, the subject invention allows for different 'configurations' to be created and managed providing supports for managing 'configuration properties'. For example, two developers working on the same project may need to use different connection strings for a relational data source. They can each define a configuration for the settings applicable to their environment, and then the values used will depend upon the active configuration that is in effect at any point in time with respect to a given environment.

Figure 7:
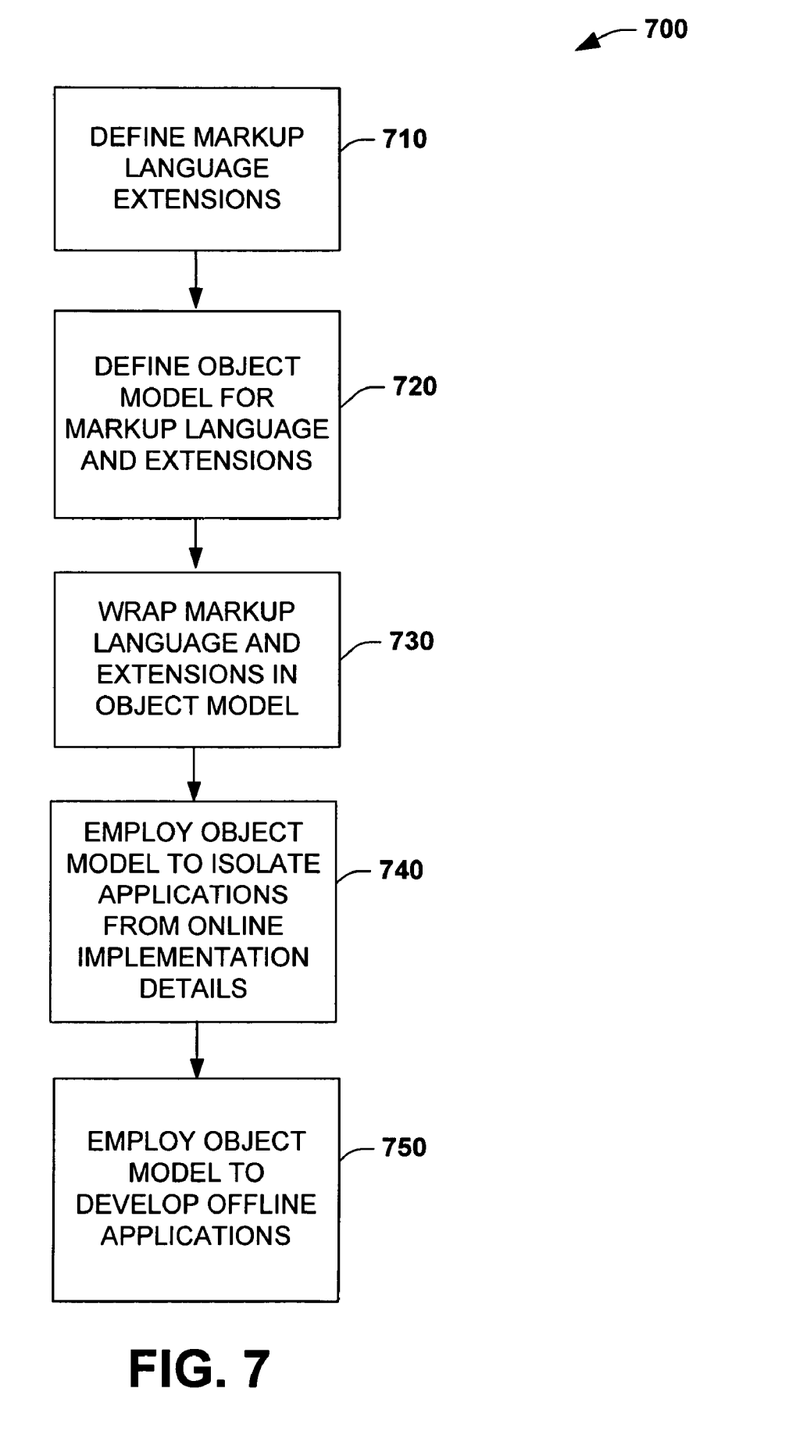
FIG. 7 is a flow chart illustrating an example object modeling process in accordance with an aspect of the subject invention.

FIG. 7 illustrates an example object modeling process 700 for data interactions in accordance with an aspect of the subject invention. While, for purposes of simplicity of explanation, the methodology is shown and described as a series or number of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

The process 700 illustrates an example object modeling and communication process between network components. Proceeding to 710, a markup language and associated extensions can be defined. As previously noted, this can include adding functionality to a base language protocol such as XMLA and extending the protocol such as adding new commands, defining object descriptions, providing for parameter references, utilizing binary to XML translations, and supporting network bindings such as TCP/IP bindings for instance. At 720, an object model is defined for the markup language and extensions defined at 710. This can include defining an object hierarchy that serves as a software translation architecture between local application languages and the remote markup languages defined at 710. At 730, the markup language and extensions are wrapped or insulated from the local language constructs by the object model. Thus, the object model operates as a translator or mapping component between application development languages on one side, and database protocols such as XMLA or extended XMLA on the other side of the model. At 740, the object model is employed to isolate online applications utilizing database servers from implementation or protocol details such as XMLA languages operative on the database server. Alternatively at 750, the object model can be employed to develop one or more offline files that can be built and transmitted to the database server at a later stage in development.

Figure 8:
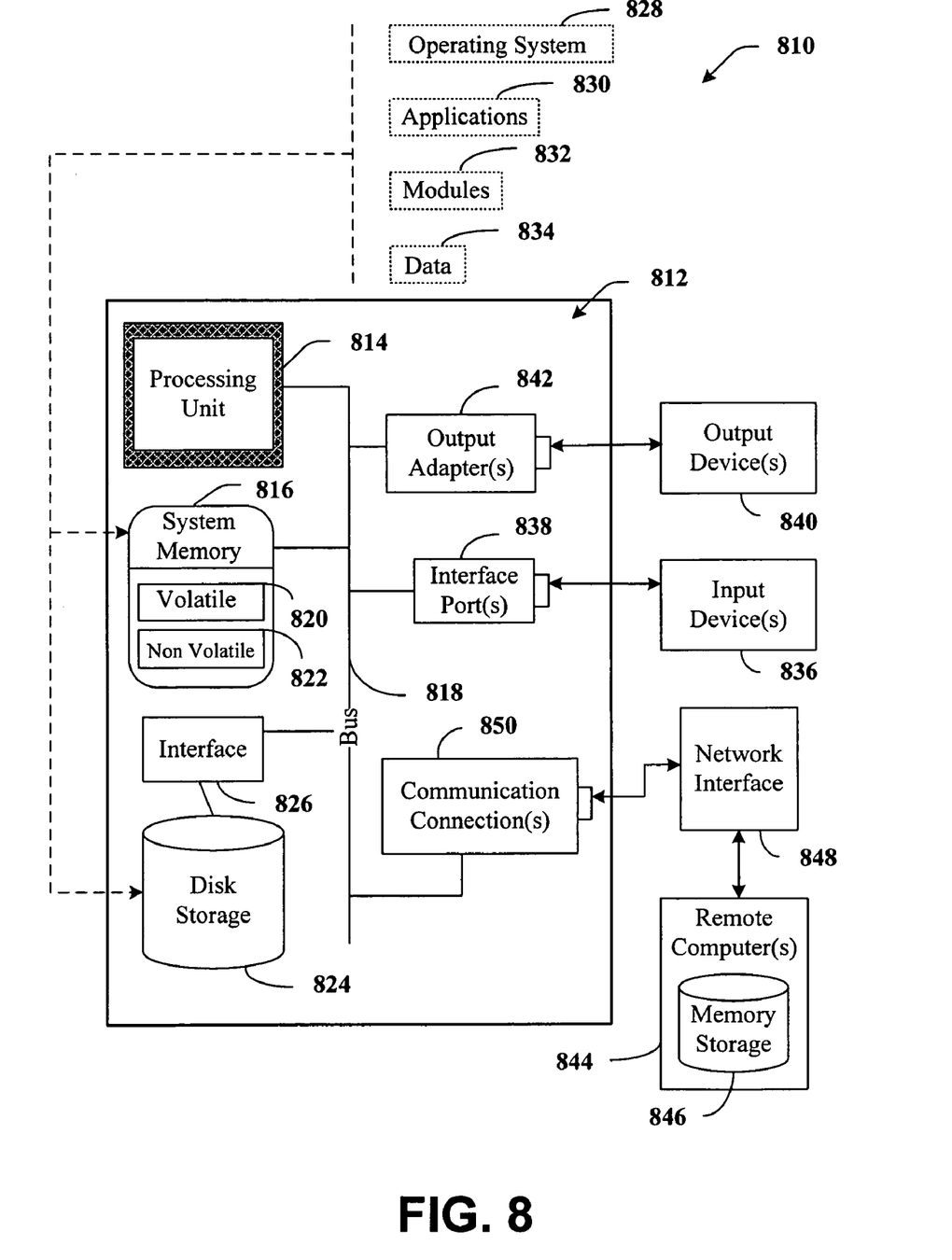
FIG. 8 is a schematic block diagram illustrating a suitable operating environment in accordance with an aspect of the subject invention.

With reference to FIG. 8, an exemplary environment 810 for implementing various aspects of the invention includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/non-removable, volatile/non-volatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the subject invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers, among other output devices 840, that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

Figure 9:
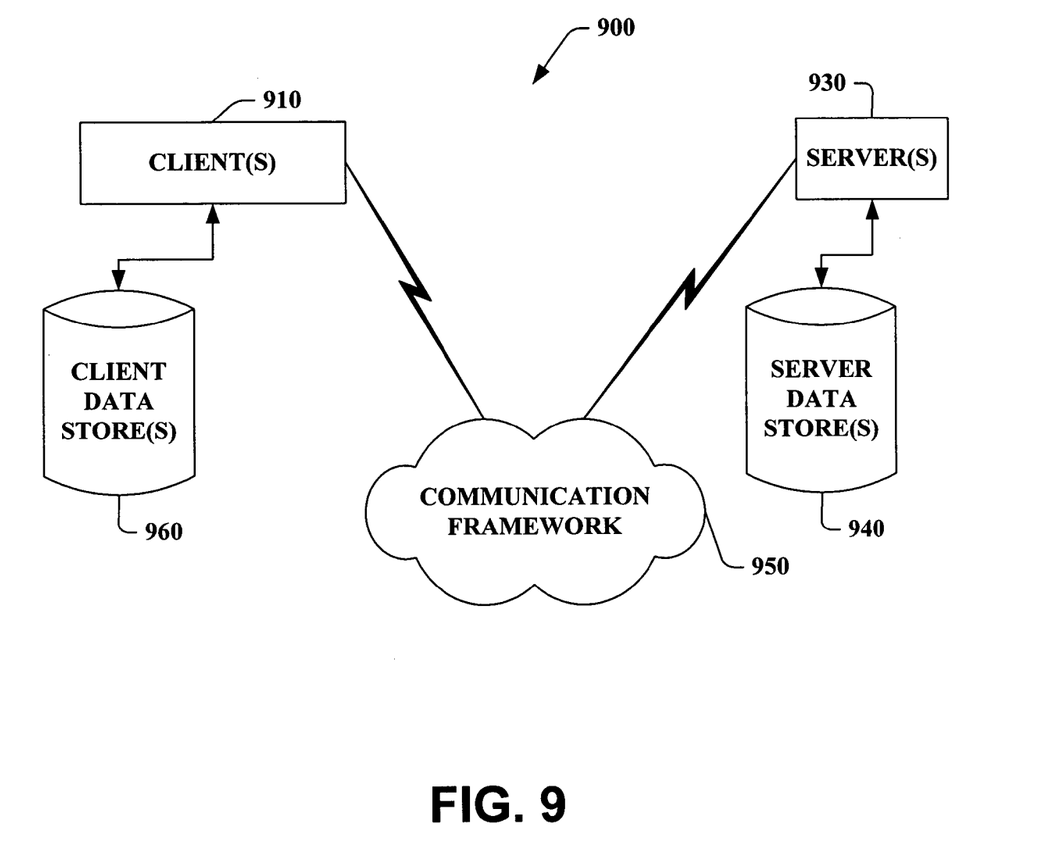
FIG. 9 is a schematic block diagram of a sample-computing environment with which the subject invention can interact.

FIG. 9 is a schematic block diagram of a sample-computing environment 900 with which the subject invention can interact. The system 900 includes one or more client(s) 910. The client(s) 910 can be hardware and/or software (e.g., threads, processes, computing devices). The system 900 also includes one or more server(s) 930. The server(s) 930 can also be hardware and/or software (e.g., threads, processes, computing devices). The servers 930 can house threads to perform transformations by employing the subject invention, for example. One possible communication between a client 910 and a server 930 may be in the form of a data packet adapted to be transmitted between two or more computer processes. The system 900 includes a communication framework 950 that can be employed to facilitate communications between the client(s) 910 and the server(s) 930. The client(s) 910 are operably connected to one or more client data store(s) 960 that can be employed to store information local to the client(s) 910. Similarly, the server(s) 930 are operably connected to one or more server data store(s) 940 that can be employed to store information local to the servers 930.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-readable storage medium encoded with a computer program to facilitate online database manipulations and offline authoring of database application, the computer program when executed by a processor provides:
    a protocol component employs computerized mark-up language to facilitate data interactions between network components;
    an computerized mark-up language extension component operates with the protocol component to support the data transactions; and
    an object model wraps the computerized mark-up language extensions inside a procedural programming language that supports online database application development features and offline database application development features, wherein the object model provides to isolate online and offline application development from the protocol component details of the server components,
    wherein the offline database application development features comprise:
        storing intermediate, and incomplete states of objects in one or more data files instead of a server; and
        providing direct object editing, versioning support, object distribution and object sharing by utilizing an XML format, and
    wherein the online database application development features comprise:
        providing a capture mode to capture XML generated by the object model;
        an object dependency calculator that assists a programmer in determining which objects are dependent upon other objects;
        an allowed bindings helper that provides information to the programmer regarding what bindings to data sources are valid for the object in a particular context; and
        generating XML scripts to define server objects to apply different operations to the scripting of the object.

2. The computer-readable storage medium of claim 1, wherein the online database application development features further comprise supporting command options as override arguments to method calls or as properties on one or more objects.

3. The computer-readable storage medium of claim 1, the object model deploys a stored procedure by loading a file.

4. The computer-readable storage medium of claim 1, the object model enables recording of at least one software buffer trace event.

5. The computer-readable storage medium of claim 1, the object model supports a capture mode to examine code generated by the object model.

6. The computer-readable storage medium of claim 1, the object model includes at least one option to apply different database operations to an object scripting operation.

7. The computer-readable storage medium of claim 1, the object model enables a system impact analysis.

8. The computer-readable storage medium of claim 1, the object model determines a server load on one or more object demands.

9. The computer-readable storage medium of claim 1, the object model is associated with a validate method that is called on objects without server interaction.

10. The computer-readable storage medium of claim 1, further comprising an offline development tool to at least one of create, define, and save new objects.

11. The computer-readable storage medium of claim 10, the offline development tool further comprising at least one configuration file to enable concurrent object development.

12. The computer-readable storage medium of claim 10, further comprising a deployment utility to deploy offline applications to a server.

13. A computer system including a processor and system memory, a computer-implemented method for interacting with a database, comprising:
    employing a base analysis protocol to communicate between database components;
    adding one or more extensions to the base analysis protocol;
    creating a list of additional objects required based on objects selected; and
    wrapping the extensions in a procedural language to isolate database applications from implementation details within the database components, wherein wrapping the extensions in a procedural programming language that supports online database application development features and offline database application development features, wherein the object model provides to isolate online and offline application development from the protocol component details of the server components,
    wherein the offline database application development features comprise:
        storing intermediate, and incomplete states of objects in one or more data files instead of a server; and
        providing direct object editing, versioning support, object distribution and object sharing by utilizing an XML format, and wherein the online database application development features comprise:
   providing a capture mode to capture XML generated by the object model;
   an object dependency calculator that assists a programmer in determining which objects are dependent upon other objects;
   an allowed bindings helper that provides information to the programmer regarding what bindings to data sources are valid for the object in a particular context; and
   generating XML scripts to define server objects to apply different operations to the scripting of the object.

14. The system of claim 13, further comprising providing an offline development tool to enable object development in an application that is remote from an online database.

15. A computer implemented system, the system including a processor and memory, comprising:
   means for extending a base analysis protocol to communicate between one or more network components;
   means for defining at least one parameter extension for the base analysis protocol; and
   means for wrapping the parameter extension in an object model protocol that supports online database application development features and offline database application development features, wherein the object model provides to isolate online and offline application development from the protocol component details of the server components,
   wherein the offline database application development features comprise:
      storing intermediate, and incomplete states of objects in one or more data files instead of a server; and
      providing direct object editing, versioning support, object distribution and object sharing by utilizing an XML format, and
   wherein the online database application development features comprise:
      providing a capture mode to capture XML generated by the object model;
      an object dependency calculator that assists a programmer in determining which objects are dependent upon other objects;
      an allowed bindings helper that provides information to the programmer regarding what bindings to data sources are valid for the object in a particular context; and
      generating XML scripts to define server objects to apply different operations to the scripting of the object.

16. A computer-implemented system for interacting with a database, comprising:
   a processor and memory;
   an application program executed by the processor, the application program comprising:
      a protocol component that employs computerized mark-up language extensions to facilitate data interactions between network components; and
   an object model that wraps the computerized mark-up language extensions inside a procedural programming language that supports online database application development features and offline database application development features, wherein the object model provides to isolate online and offline application development from the protocol component details of the server components,
   wherein the offline database application development features comprise:
      storing intermediate, and incomplete states of objects in one or more data files instead of a server; and
      providing direct object editing, versioning support, object distribution and object sharing by utilizing an XML format, and
   wherein the online database application development features comprise:
      providing a capture mode to capture XML generated by the object model;
      an object dependency calculator that assists a programmer in determining which objects are dependent upon other objects;
      an allowed bindings helper that provides information to the programmer regarding what bindings to data sources are valid for the object in a particular context; and
      generating XML scripts to define server objects to apply different operations to the scripting of the object.

* * * * *